United States Patent

[11] 3,578,182

[72] Inventor Edward M. Harvey
 200 Meadowbrook, Hot Springs, Ark. 71901
[21] Appl. No. 863,061
[22] Filed Oct. 2, 1969
[45] Patented May 11, 1971

[54] LUMBER CART HAVING CRADLE WITH VARIABLE HEIGHT
 4 Claims, 7 Drawing Figs.
[52] U.S. Cl. ..................................... 214/6, 214/44
[51] Int. Cl. ....................................... B65g 57/03
[50] Field of Search .......................... 214/396, 6 (H), 6 (G), 44 (B), 82, 10.5

[56] References Cited
 FOREIGN PATENTS
 545,518  8/1957  Canada ..................... 214/6H
 546,359  9/1957  Canada ..................... 214/6H
 684,851  12/1939  Germany ................... 214/6H Primary Examiner—Albert J. Makay
Attorney—John R. Walker, III ABSTRACT: A lumber cart for use in the lumber industry such as a sawmill for receiving lumber pieces one at a time from a conveyor such as a lumber sorter, which categorizes lumber into categories having identical dimensions. The cart includes a rectangular frame supported on four wheels adapted to ride on rails, four stanchions positioned one at each corner and a winchlike mechanism having two spools for winding wire rope cable onto and a brake band and drum portion which creates holding action of the spools stopping rotation of the spool assembly when the brake band is allowed to engage the brake drum. The wire rope cable is arranged between the two forward stanchions and the two rearward stanchions in such a manner that the slack in the suspended cable forms a cradle for receiving the lumber pieces at an elevation near the uppermost portion of the stanchions and the winchlike mechanism enables the cradling portion of the cables to slippingly change elevation downwardly to variable heights. Two of the stanchions, one fore and one aft both being on the same side of the cart, are pivotally attached to the frame allowing them to articulate outwardly facilitating unloading.

Patented May 11, 1971
3,578,182
2 Sheets-Sheet 1
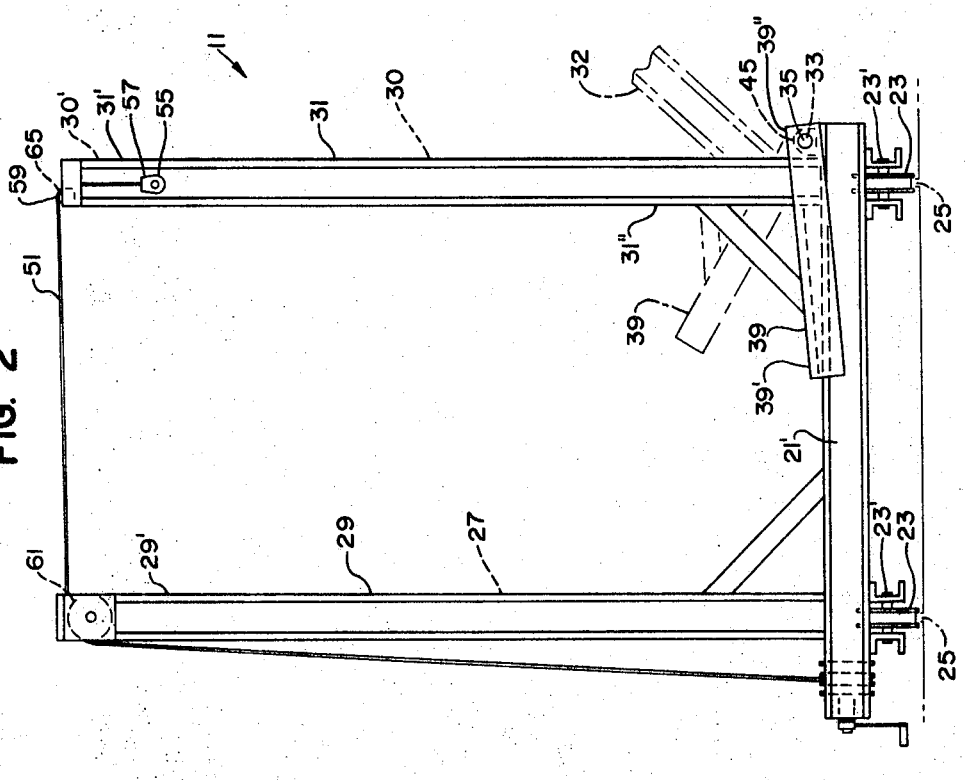
INVENTOR.
EDWARD M. HARVEY
BY John R. Walker, III
Attorney Patented May 11, 1971
3,578,182
2 Sheets-Sheet 2
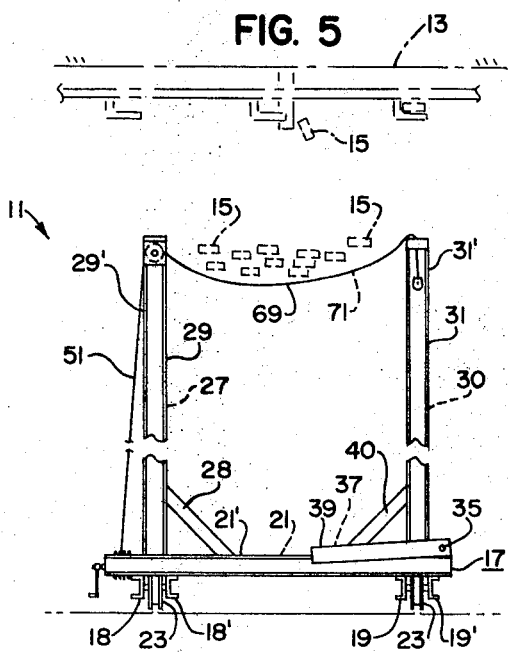
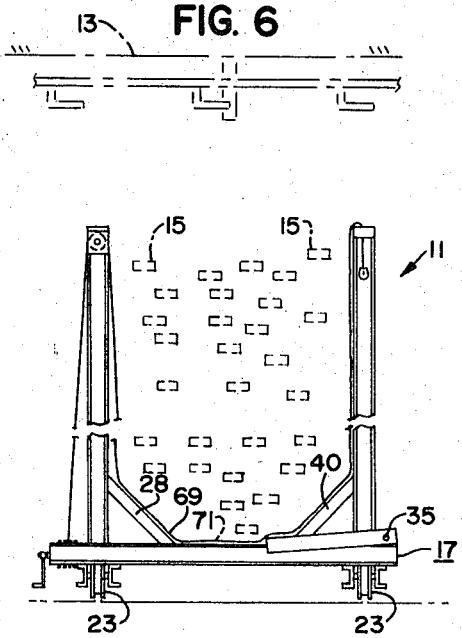
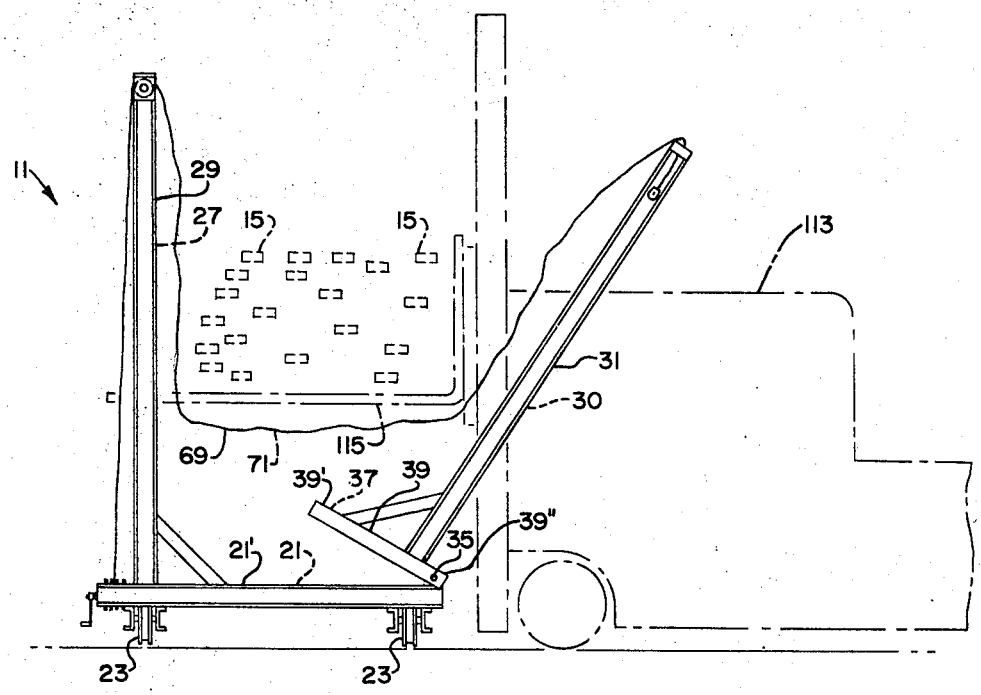
INVENTOR.
EDWARD M. HARVEY
BY John R. Walker, III
Attorney

LUMBER CART HAVING CRADLE WITH VARIABLE HEIGHT

BACKGROUND OF THE INVENTION

1. Field of the Invention

This invention relates to lumber carts for use in the lumber industry, as in a sawmill.

2. Description of the Prior Art

The typical prior art lumber carts used with a lumber sorter included a four wheel cart with upstanding stanchions to contain the lumber dropped from the lumber sorter to the bottom of the cart during the initial loading thereof. In other words, the cart was loaded from adjacent the bottom progressively upwardly. In addition, in some of the prior carts the stanchions of the carts were pivotable so that they would pivot downwardly in unloading.

There were certain disadvantages to the prior carts, among them being the following: There was a tendency for the lumber to break or split during loading, particularly the first pieces loaded in the cart since there was a considerable distance that the pieces had to fall from the lumber sorter to the bottom of the cart. Also, the lumber had a tendency to bounce after falling such a distance and, therefore, the pieces of lumber were not always positioned in relatively parallel relationship with one another.

SUMMARY OF THE PRESENT INVENTION

The present invention is directed towards providing an improved lumber cart and one which overcomes the heretofore mentioned and other disadvantages of prior lumber carts.

One of the principal concepts of the present invention is to provide an adjustable cradle means which enables the lumber pieces to be received relatively close to the disengagement mechanism of the lumber sorter whether it be the first piece to fall on the cart or the last. Said cradle means is provided by pair of flexible elongated members such as wire rope cables or the like which are each anchored at one of the ends thereof and extend through pulleys and span the distance between the forward and rearward pairs, respectively, of the stanchions. The elongated members are led downwardly and to spools on a spool and brake assembly. The spool and brake assembly is actuated by a crank to raise the cradles upwardly to an initial loading position, and means is provided for manually releasing the brake at desired times to allow the weight of the lumber to carry the cradles downwardly at intervals as the lumber is being loaded so that the falling distance of the lumber pieces can be kept at a minimum throughout the loading process.

Another feature of the present invention is the provision of eliminating binding of the lumber between stanchions during unloading by a forklift truck. Thus, two of the stanchions are pivotable and have inwardly extending shoes adjacent the lower ends thereof. During the initial phases of the loading, the weight of the lumber keeps the pivotable stanchions in an upright position and towards the latter part of the loading, the weight of the pieces rest on the shoes and keep the stanchions in a positive vertical position. Then, during the lifting action of the forklift, which displaces the weight of the lumber pieces from the shoes and the cradle, the pivotally attached stanchions are allowed to articulate outwardly nullifying any lateral binding between the stanchions.

BRIEF DESCRIPTION OF THE DRAWINGS

FIG. 1 is a side elevational view of the lumber cart of the present invention.

FIG. 2 is a rear elevational view thereof, and showing in broken lines a pivotable stanchion in tilted position.

FIG. 3 is a sectional view taken as one the line III–III of FIG. 1.

FIG. 4 is a sectional view taken as on line IV–IV of FIG. 1.

FIG. 5 is a somewhat diagrammatic view showing the loading of the lumber cart from a lumber sorter during the initial phases of the loading.

FIG. 6 is a view of the same after the cart has been loaded.

FIG. 7 is a view of the same during unloading thereof by a forklift truck, with the forklift truck being shown in broken lines.

DESCRIPTION OF THE PREFERRED EMBODIMENT

The lumber cart of the present invention indicated by numeral 11 is intended for use in the lumber industry, more particularly as in a sawmill. Cart 11 is one of a plurality which are positioned side by side forming a straight line under a conveyor such as a lumber sorter 13 which moves transversely overhead at a substantial height and automatically or remotely selects or sorts lumber pieces 15 as to length or width, etc., by disengaging, and thus allowing to fall, all like piece 15 one at a time onto one such cart 11. Cart 11 includes a rectangular shaped frame 17, which is made from two opposing channel iron longitudinal members 18, 18' or the like in spaced apart relationship on the one side and two opposing channel iron longitudinal members 19, 19' or the like in spaced apart relationship on the other side, a forward I-beam lateral member 21 and a rearward I-beam lateral member 21'. Frame 17 is supported by at least four wheels 23 rotatably mounted fore and aft between longitudinal members 18, 18' and 19, 19' respectively on axles 23', wheels 23 being free to runningly ride on rails 25.

Two stanchions, one forward and one rearward 27, 29 respectively, formed from I-beam steel or the like are fixedly attached in a vertical position adjacent the corners of one side of the horizontal frame. Sloping members 28 are respectively fixedly attached at the opposite ends thereof between stanchions 27, 29 and frame 17. The forward stanchion 27 is fixedly attached adjacent the junction of longitudinal member 18, 18' and lateral member 21. The rearward stanchion 29 is fixedly attached adjacent the function of longitudinal members 18, 18' and lateral member 21'. Two stanchions, one forward and one rearward 30, 31 respectively formed from I-beam steel or the like include cross members or shoes 37, 39 respectively fixedly attached at the lower ends thereof, with each of stanchions 30, 31 now having the shape of an L. Stanchions 30, 31 are pivotally attached in a vertical position adjacent the corners of the other side of horizontal frame 17 from stanchions 27, 29 so that the four stanchions 27, 29, 30 and 31 are disposed at the four corners of frame 17. Forward stanchion 30 is pivotally attached adjacent the junction of longitudinal members 19, 19' and lateral member 21 of frame 17 and rearward stanchion 31 is pivotally attached adjacent the junction of longitudinal members 19, 19' and lateral member 21' of frame 17. Forward stanchion 30 pivots around pivot pin 33 and rearward stanchion 31 pivots around pivot pin 35. Both stanchions 30, 31 have horizontal members or shoes 37, 39 directed inwardly.

FIG. 2 shows stanchion 31 in solid lines in a vertical position and in broken lines in a tilted position. It will be noted that when stanchion 31 is in a vertical position, shoe 39 is in a substantially horizontal position, and when stanchion 31 is tilted downwardly, shoe 39 is correspondingly tilted upwardly.

It should be understood that shoe 37 and shoe 39 are fixedly attached to stanchions 30, 31 respectively at an angle which insures that stanchions 30, 31 are in the vertical position when shoes 37 and 39 are resting on lateral cross members 21, 21' respectively.

Sloping members 40 are respectively fixedly attached adjacent the upper ends thereof to stanchions 30, 31 and angled downwardly where they are fixedly attached at the lower end thereof to the respective shoes 37, 39. In order to provide a better understanding of the structure of shoes 37, 39 and since both shoes and stanchions 30, 31 are identical, a more detailed description of rearward shoe 39, rearward stanchion 31 and their attachment to frame 17 will now be discussed.

Referring now to FIGS. 1, 2 and 4, stanchion 31 is formed from I-beam steel or the like. Shoe 39 is constructed of a pair of vertically disposed parallel platelike members 41 and a horizontal platelike member 43 fixedly attached along the upper edges of platelike members 41 and at butt edge to the inward face of stanchion 31. Members 41 extend outwardly beyond stanchion 31 to provide the outward portions 39'' of platelike members 41 which have apertures for receiving pivot pin 35. Pin 35 is horizontally received through apertures in a pair of vertically disposed parallel ears 45 which are fixedly attached to the outermost end of lateral frame member 21'.

Two elongated flexible members as wire rope cables or the like, one rearward and one forward 51, 53 respectively, will now be discussed (refer to FIGS. 1 and 2). One end of cable 51 is anchored with a wire rope thimble and clamp 55, 57 respectively adjacent the upper portion 31' of stanchion 31. Cable 51 then extends upwardly and over a fixedly attached pulley or sheave 59 positioned at the uppermost extremity of stanchion 31, then extends laterally to a pulley 61 attached to the upper end 29' of stanchion 29 with the rotating axis parallel to longitudinal axis of cart 11, thence downwardly adjacent and parallel to stanchion 29 to a pulley 63 attached to lateral member 21', with the rotating axis being parallel to the lateral axis of cart 11, thence forward horizontally and parallel with the longitudinal axis of cart 11 to and finally terminating at a spool 75, which will be described further on. Cable 53 is anchored at one end in like manner as described for cable 51 adjacent upper end 30' of stanchion 30. Cable 53 extends upwardly to a fixed sheave 65, thence laterally to pulley 67 axially attached to the upper end 27' of stanchion 27, the rotating axis being parallel to the longitudinal axis of cart 11, thence downwardly adjacent and parallel to stanchion 27 terminating at a spool 77, to be described further on. The slack in the suspended wire rope cable 51 between stanchions 29, 31 forms a rearward arcuate cradle 69, as best viewed in FIG. 5. The slack in the suspended wire rope cable 53 between stanchion 27, 30 forms a forward arcuate cradle 71. It should be understood that cradles 69, 71 are preferably parallel one with the other, therefore, FIGS. 5—7 depict cradle 69 only which theoretically obliterates viewing cradle 71. Cradles 69, 71 have the function of receiving a plurality of lumber pieces 15 as they fall from the lumber sorter 13. The height of the receiving cradle 69, 71 is variable by a winchlike dual spool and brake assembly 73, which will now be described.

Brake assembly 73 comprises takeup spool 75 for cable 51, takeup spool 77 for cable 53, a brake drum 79, a brake band 81 and a crank 83 to wind the takeup spools. The two spools 75, 77 and brake drum 79 are ganged together on shaft 85 which is axially attached through a pair of bearings 87, 89 to a support bracket 91. Brake assembly 73 is interconnected by support bracket 91 to lateral frame member 21 adjacent stanchion 27 outboard of the periphery of frame 17 (see FIGS. 1 and 3). A brake handle 93 having an arm forming a bell crank lever 95 is pivotally attached through interconnecting support structure 97 at pivot pin 99, to stanchion 27. A pull spring 101 having one end swingably attached to stanchion 27 and the other end swingably attached in an aperture 103 in upper portion 93' of brake handle 93 urges brake handle 93 inwardly toward stanchion 27 (see FIG. 1). Brake band 81 has a fixed end 81' and a movable or actuating end 81''. Fixed end 81' is fixedly attached to support structure 97 and band 81 slippingly engages a portion of the circumference of brake drum 79. Actuating end 81'' clampingly binds brake band 81 around brake drum 79 indirectly by the inward pull of spring 101, handle 93 is urged inwardly rotating bell crank 95 arcuately clockwise, as viewed in FIG. 1, which in turn pulls a pushrod 109 and a clevis 105 as clevis 105 rotates around clevis pin 107. Pushrod 109 is preferably threaded at each end. Clevis 105 engages threads on one end and adjusting nut 111 engages threads on the opposite end. Adjusting nut 111 facilitates adjustment of brake band 81, as best viewed in FIG. 1.

In operation, with car 11 preferably being empty, a workman operates hand crank 83 which is keyed to shaft 85, thus winding the cables 51, 53 onto spools 75, 77 which in turn takes up the excessive slack in cradles 69, 71 placing them at the uppermost portion of stanchions 27', 29', 30' and 31'.

Cart 11 is moved to a position directly beneath lumber sorter 13, as best viewed in FIGS. 5 and 6. As the lumber pieces 15 continue moving along the lumber sorter 13, all pieces 15 of a predetermined size are dropped and caught in cradle 69, 71. As lumber pieces 15 commences piling up, the workman momentarily actuates brake handle 93 by pulling outwardly, this action relaxes brake band 81 thus loosening it or disengaging it from brake drum 79. The lumber pieces 15 suspended above the ground on cables 51, 53 possess potential energy. When the holding action of brake assembly 73 is released, the lumber pieces tend to fall or move downwardly, the energy is changed to kinetic energy causing spools 75, 77 to rotate, paying out cables 51, 53 which slip transversely under the loaded lumber pieces 15, decreasing the height of cradle 69, 71 to a desired level. The workman repeats this procedure as frequently as desired until the stack attains the desired height, or cart 11 is fully loaded. The adjustable height feature enables each lumber piece 15 to be received relatively close to the disengagement mechanism of the lumber sorter 13 whether it be the first piece to fall on cart 11 or the last. This feature has a two-fold advantage: (1) The lumber 15 always falling such a relatively short distance greatly reduces the possibility of braking to splitting; (2) It minimizes the tendency for the lumber 15 to bounce after falling which assures that lumber pieces 15 are positioned on cart 11 in a relatively parallel relationship one with the other, as opposed to being crosswise. The slipping action of cable 51, 53 beneath the suspended lumber pieces 15 tends to roll the lumber pieces 15 which aids in aligning lumber pieces 15 in a parallel relationship one with the other. The parallel relationship of piece 15 enables each cart 11 to receive more pieces 15 and results in a savings of labor required for straightening any pieces 15 that fell in a crosswise position.

The prevailing problem of removing the lumber pieces 15 wedged between the stanchions has been solved by the present invention in a manner which will now be described. The two stanchions, one fore and one aft 30, 31, respectively, having the label 51, 53 ends anchored thereto articulate outwardly around pivot pin 33, 35. These two stanchions 30, 31 are constructed identical and have the form of an L with the horizontal segments of the L forming a shoe 37, 39 or resting surface which the cradle 69, 71 of lumber pieces 15 is lowered upon, with the vertical segments of the L forming the upright or stanchion. The weight of the pieces 15 resting on the shoes 37, 39 keeps the stanchions 30, 31 in a positive vertical position. When the cradle 69, 71 is elevated, i.e., not resting on shoe 37, 39, the vertical position of the stanchion 30, 31 is assured by the weight of the lumber pieces 15 suspended in cradle 69, 71 with the moment of force from cable 51, 53 pulling inwardly on the sheaves 59, 65 at the uppermost portion 30', 31' of stanchion 30, 31. It should be understood that unloading a typical lumber cart by use of a forklift would not be feasible due to the binding or wedging of the lumber between upright support structure of the cart, and any attempt to lift lumber from such a cart would result in lifting lumber pieces and cart in unity. Unloading cart 11 of the present invention is accomplished quickly and easily by positioning a forklift 113 transversely to the cart 11 with the tines 115 to the forklift 113 directly under the pieces 15. The lifting action of the forklift 113 displaces the weight from the shoes 37, 39 and/or the cradles 69, 71 thus allowing the pivotally attached stanchions 30, 31 to articulate outwardly nullifying any lateral binding between stanchions 30, 31 and 27, 29 of the pieces 15 as the forklift 113 is driven back away from the lumber cart, as best viewed in FIG. 7.

Although the invention has been described and illustrated with respect to a preferred embodiment thereof, it is to be understood that it is not to be so limited since changes and modifications may be made therein which are within the full intended scope of this invention.

I claim:

1. A lumber cart comprising a rectangular frame having four corners including a forward pair and a rearward pair of corners, wheel means movably supporting said frame; four stanchions including a forward pair and a rearward pair of stanchions, disposed adjacent the four corners of said frame and upstanding from said frame; a forward elongated flexible member and a rearward elongated flexible member, means fixedly attaching one end of said forward elongated member to one of said forward pair of stanchions and fixedly attaching one end of said rear elongated member to one of said rearward pair of stanchions, means movably suspending said forward elongated member across from said one of said forward pair of stanchions to the other of said forward pair of stanchions to establish a forward cradle, means movably suspending said rearward elongated member across from said one of said rearward pair of stanchions to establish a rearward cradle adapted in conjunction with said forward cradle to hold pieces of lumber, and means for controlling the height of said forward reward cradles relative to said stanchions, means pivotally mounting one of said forward pair of stanchions on said frame at one of said forward corners to establish a forward pivotable stanchion pivotable between a normal vertical position and outwardly tilted unloading positions, said forward pivotable stanchion including an inwardly extending shoe upon which the lumber pieces are adapted to rest, and means pivotally mounting one of said rearward pair of stanchions on said frame at one of said rearward corners to establish a rearward pivotable stanchion pivotable between a normal vertical position and outwardly tilted unloading positions, said rearward pivotable stanchion including an inwardly extending shoe upon which the lumber pieces are adapted to rest.

2. The lumber cart of claim 1 in which said means for controlling the height of said forward and rearward cradles includes spool means rotatably mounted on said frame, means movably guiding said forward and rearward elongated members to said spool means, and means attached to said spool means for winding said elongated members on said spool means to hoist said forward and rearward cradles upwardly relative to said stanchions.

3. The lumber cart of claim 2 in which said means for controlling the height of said forward and rearward cradles further includes releasable brake means for releasing said spool means to allow said forward and rearward cradles to lower under the weight of the lumber pieces carried thereby.

4. The lumber car of claim 3 in which said brake means includes a brake drum fixedly mounted relative to said spool means for rotation therewith about the same axis as said spool means, a brake band encircling said brake drum, a brake handle pivotally mounted on one of said stanchions, and means interconnecting said brake handle and said brake band for the actuation of said brake band by said brake handle.